Jan. 1, 1963 F. S. LAPEYRE 3,070,832
PRESSURE FINGER LOADING DEVICE FOR A SHRIMP PEELING MACHINE
Filed Feb. 17, 1961 2 Sheets-Sheet 1

FIG. I.

INVENTOR
Fernand S. Lapeyre

BY
Wilkinson, Mawhinney & Theibautt
ATTORNEYS

Jan. 1, 1963  F. S. LAPEYRE  3,070,832
PRESSURE FINGER LOADING DEVICE FOR A SHRIMP PEELING MACHINE
Filed Feb. 17, 1961  2 Sheets-Sheet 2
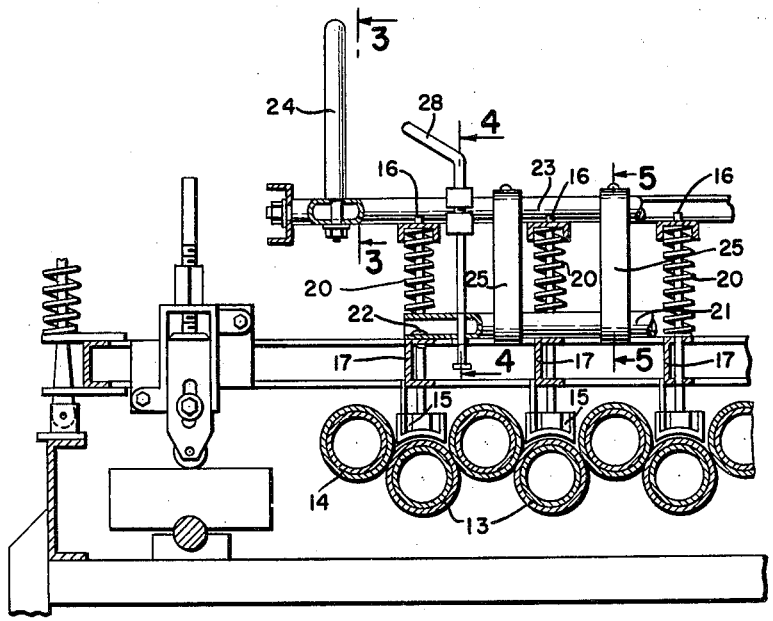
FIG.2.
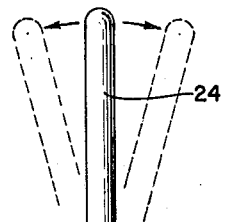
FIG.3.
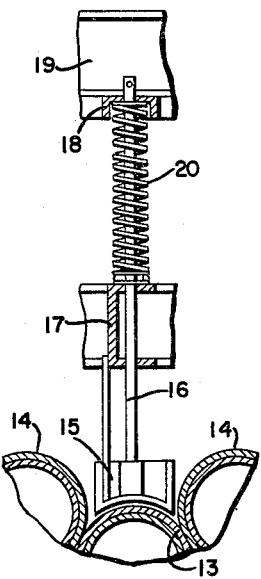
FIG.6.
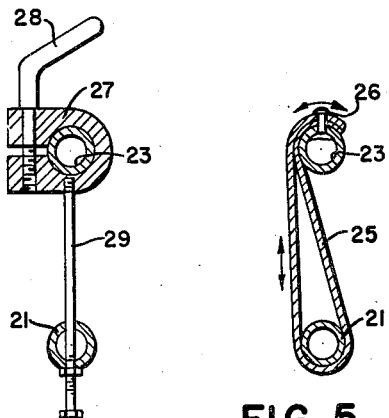
FIG.4.
FIG.5.
INVENTOR
Fernand S. Lapeyre
BY Wilkinson, Mawhinney & Theibault
ATTORNEYS 3,070,832
PRESSURE FINGER LOADING DEVICE FOR A
SHRIMP PEELING MACHINE
Fernand S. Lapeyre, New Orleans, La., assignor to The
Peelers Company, Houma, La., a partnership
Filed Feb. 17, 1961, Ser. No. 90,033
3 Claims. (Cl. 17—2)

The present invention relates to a pressure finger loading device for a shrimp peeling machine, and has for an object to provide means for loading differentially or equally and simultaneously all of the pressure fingers carried in a pressure finger frame such as pressure finger frame illustrated in U.S. Patent No. 2,778,055, granted January 22, 1957.

At times during the peeling of shrimp in a machine of the above type, in order to afford a different character of peeling operation, it may be desirable to differentially increase the spring loading of the pressure fingers. I have provided a means whereby all pressure fingers may not only be uniformly regulated transversely of the machine but whereby the pressure on the fingers in the longitudinal peeling channels of the machine may be of differential character. To accomplish this I have provided in each finger frame two rotatable shafts, one proximate the upper end of the frame and the other proximate the lower end of the frame, which shafts have secured to them flexible strap devices which are passed about lower anchor portions of the finger frame and which upon rotation of the shaft will cause a lowering of the upper member which will increase the spring loading imparted to the stem, and hence to the pressure finger itself.

As a further object of this invention, I have provided means for compelling rotation of the shaft as well as a locking means to retain the shaft at any predetermined angle of rotation of the shaft to thereby maintain the desired pressure setting on the pressure fingers in the peeling channels.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 2 is a fragmentary transverse section showing the relationship between the finger frames, pressure fingers and peeling rolls in which the device of the present invention has been added to the finger frames.

FIGURE 3 is a section taken on the line 3—3 in FIGURE 2.

FIGURE 4 is a vertical section taken on the line 4—4 in FIGURE 2.

FIGURE 5 is a section taken on the line 5—5 in FIGURE 2.

FIGURE 6 is a fragmentary sectional view of a peeling channel, pressure finger and the finger frame mounting for the pressure finger, taken at an enlarged scale with parts broken away and parts shown in section.

Figure 1:
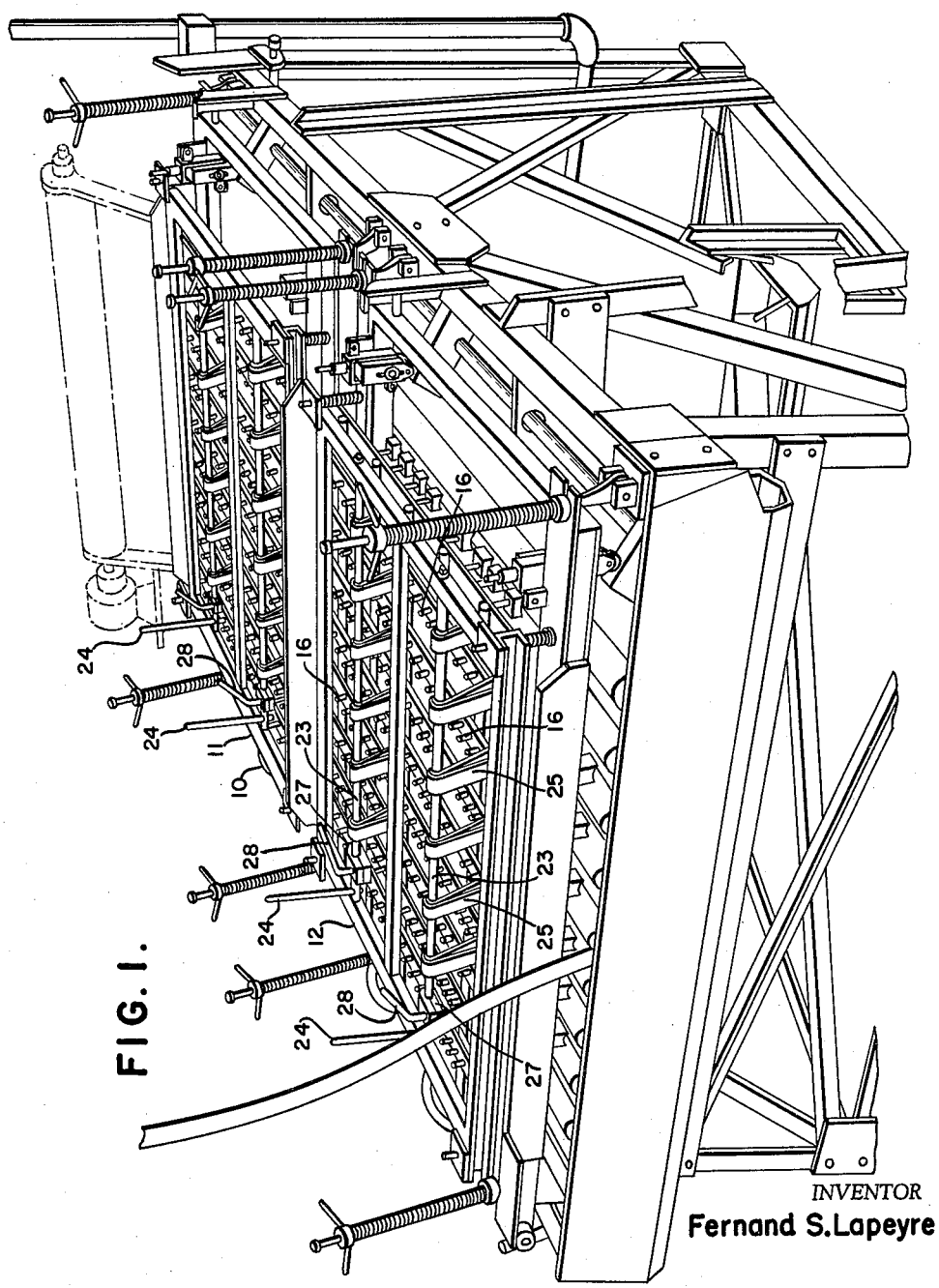
FIGURE 1 is an enlarged perspective view of a shrimp peeling machine in which the pressure finger frames have been modified in accordance with the present invention.

Referring more particularly to the drawings, 10 designates generally a shrimp peeling machine having an upper pressure finger frame 11 and a lower pressure finger frame 12. These pressure finger frames overlie shrimp peeling channels, as best seen in FIGURE 6, which may consist of a base roller 13 and side rollers 14, which defines a channel having two peeling crotches and into which channel is vertically elevatable a pressure finger 15 for urging the shrimp into the peeling crotches of the peeling channel.

The pressure fingers 15 and stems 16 which pass through openings in a guide channel 17 carried by the lower rectangular support member of a finger frame and which likewise extend up through guide support members 18 carried by the upper rectangular finger frame structure 19.

As best seen in FIGURE 6, the pressure finger stems 16 have helical springs 20 thereabout lying between the longitudinal guide members 17 and 18. The upper end of the spring 20 merely abuts the web of the channel member 18 while the lower end of the helical spring 20 is placed in positive engagement with the stem 16 of the pressure finger 15 whereby upon movement of the member 18 toward the member 17, the spring load or increased pressure is transmitted to the pressure finger 15 through its stem 16 which has been connected to one end of the spring 20.

Referring now to FIGURE 2, secured to the various lower pressure finger stem guide members 17 is a tubular member 21 which is secured to each channel by an exploded rivet 22. Journalled in the top rectangular support member of the finger frame construction is a tubular shaft member 23 which in journalled in the finger frame for rotation. An operating lever 24 is secured to the shaft 23 to compel rotation thereof, as best seen in FIGURE 3.

Between each peeling channel and secured to the rotatable tubular shaft 23 is a flexible connection in the form of a flexible strap 25 both ends of which have been secured to the rotatable shaft 23 by an explodable rivet construction 26. As best seen in FIGURE 5, the flexible strap member passes about and beneath the tubular member 21 which has been anchored to the lower frame structure. Upon rotation of the lever 24 clockwise in FIGURE 3, the shaft 23 of FIGURE 5 will be rotated causing the flexible strap 25 to cause relative movement between the pressure finger guides and the anchor member 21 secured to the bottom of the finger frame resulting in a compression of the helical springs 20 which will increase the pressure loading on the pressure fingers 15 through their stems 16. Once the lever 24 has been rocked clockwise, as in FIGURE 3, to wrap the flexible strap upon the shaft 23 causing relative movement between upper and lower portions of the tubular member 21 and hence imparting an increased loading on the pressure finger 15, such order of pressure may be preserved by means of a locking device which may consist, for example, of a split block 27 through which the shaft 23 is journalled and which split block receives a biting or clamping action by means of a threaded operating handle 28 which will draw the split portion of the block 27 together and rigidly grip the shaft 23 to preserve the pressure loading. The block 27 is maintained in position by means of a bolt 29 which passes through an opening in the non-rotatable tubular anchor member 21 but which member will permit the anchor member 21 to ride up and down about the bolt 29 regardless of relative movement.

Two such shafts 23 are provided in each finger frame section and two locking handles 28 with each block 27 are provided in each finger frame section, as well as two shaft operating levers 24 being provided in each section.

In operation, should it become desirable to decrease the pressure which the pressure finger is exerting upon the shrimp in the peeling channel, the locking lever 28 is then released and the operating handle 24 is then rotated counterclockwise as shown in FIGURE 3, which will lengthen the flexible strap member and the distance between the upper and lower pressure finger guides under the counter influence of the helical springs 20 to thereby reduce the pressure which the springs had heretofore imposed upon the pressure fingers. It will be appreciated that with two such devices in each finger frame it would be possible to vary the pressure exerted on the pressure fingers longitudinally of the channel as well as transversely of the channel.

Although I have disclosed herein the best form of the invention known to me at this time, I reserve the right to all such modifications and changes as may come within the scope of the following claims.

What I claim is:

1. For use with the finger frame of a shrimp peeling machine having an upper and lower rectangular finger frame carrying guides in which pressure fingers are mounted and spring loaded between the upper and lower rectangular frames, a pressure finger loading device comprising a flexible connection between the upper frame member and the lower frame member, means connected to said flexible connection and carried by one of said frame members for causing said upper frame member to move toward and away from the lower frame member to vary the spring loading an said pressure fingers, and locking means for said last-named means to maintain a predetermined pressure on said pressure fingers by compression of the springs between the upper and lower frame members.

2. For use with the finger frame of a shrimp peeling machine having an upper and lower rectangular finger frame carrying guides in which pressure fingers are mounted and spring loaded between the upper and lower rectangular frames, a pressure finger loading device comprising a rotatable shaft carried by said upper frame member and extending across same, an anchor member secured to and carried by said lower frame member, a flexible connection both ends of which are secured to said rotatable shaft and which is passed about said anchor member carried by said lower frame, operating means for rotating said shaft to cause said flexible connection to wrap about said shaft and draw said shaft toward said anchor means to thereby increase the spring loading on the pressure fingers carried by the frame, and locking means for said rotatable shaft for restraining said shaft against rotary movement when the desired spring load is imposed on the pressure fingers.

3. A pressure finger loading device as claimed in claim 2, wherein said locking means comprises a split bearing block carried by said upper frame member and vertically movable with respect to said lower frame, said bearing block having an operating lever for imparting a frictional binding engagement on said rotary shaft.

References Cited in the file of this patent

UNITED STATES PATENTS

| | | |
|---|---|---|
| 2,778,055 | Lapeyre et al. | Jan. 22, 1957 |
| 2,815,117 | Lapeyre et al. | Dec. 3, 1957 |